United States Patent
Patzelt et al.

(10) Patent No.: US 6,800,332 B2
(45) Date of Patent: Oct. 5, 2004

(54) METHOD FOR IMPROVING THE TRANSFER EFFICIENCY OF PAINT

(75) Inventors: Robert Patzelt, Ferndale, MI (US); Thomas Vivian, Fenton, MI (US)

(73) Assignee: Gage Products Company, Ferndale, MI (US)

( * ) Notice: Subject to any disclaimer, the term of this patent is extended or adjusted under 35 U.S.C. 154(b) by 28 days.

(21) Appl. No.: 10/225,995

(22) Filed: Aug. 22, 2002

(65) Prior Publication Data

US 2003/0054112 A1 Mar. 20, 2003

Related U.S. Application Data

(60) Provisional application No. 60/314,574, filed on Aug. 23, 2001.

(51) Int. Cl.[7] .................................................. B05D 1/02
(52) U.S. Cl. ...................................................... 427/421
(58) Field of Search ......................................... 427/421

(56) References Cited

U.S. PATENT DOCUMENTS

| | | | |
|---|---|---|---|
| 3,385,810 A | 5/1968 | Barrett | 260/28.5 |
| 3,496,006 A | 2/1970 | Rideout et al. | 117/45 |
| 3,713,872 A | 1/1973 | Porter, Jr. et al. | 117/75 |
| 4,537,926 A | 8/1985 | Kivel et al. | 524/388 |
| 5,418,283 A | 5/1995 | Meyer | 525/50 |

Primary Examiner—Bernard Pianalto
(74) Attorney, Agent, or Firm—Gifford, Krass, Groh, Sprinkle, Anderson & Citkowski, P.C.

(57) ABSTRACT

An additive for improving the transfer efficiency of paint comprises an ultra high molecular weight polymer dissolved in a solvent selected from the group consisting of glycol ethers, halogenated aromatic materials and combinations thereof. UHMW acrylic polymers are one preferred group of polymers, and materials with a molecular weight in the range of 8,000,000–12,000,000 are particularly preferred. Also disclosed are methods for using the additive.

7 Claims, 4 Drawing Sheets

METHOD FOR IMPROVING THE TRANSFER EFFICIENCY OF PAINT

RELATED APPLICATION

This patent application claims priority of provisional application Ser. No. 60/314,574 filed Aug. 23, 2001, and entitled "Additive and Method for Improving the Transfer Efficiency of Paint."

FIELD OF THE INVENTION

This invention relates generally to painting. More specifically, the invention relates to additive formulations which improve the transfer efficiency of paint and to methods for the use of the additives.

BACKGROUND OF THE INVENTION

Spray painting techniques are rapid, and easy to implement, and hence widely employed in many manufacturing processes. However, spray painting generally wastes significant amounts of paint because of overspray, poor adherence and the like. Transfer efficiency is a measure of the amount of paint actually applied to articles being spray painted. Even in the best of processes, 40–45% of the paint is lost, corresponding to a transfer efficiency of 55–65%. Paints are generally quite expensive; hence, any improvement in the transfer efficiency of a painting process will advantageously impact the economics of the process and lessen problems of pollution resultant from inefficiencies in the painting process. It is to be understood that, within the context of this disclosure, the term "paint" is understood to include coating materials colored with pigments or dyes, as well as clear coats, varnishes, sealers, stains and the like.

Particular polymeric additives have been found to improve the transfer efficiency of sprayed paint. U.S. Pat. No. 3,713,872, which is incorporated herein by reference, discloses one such additive comprising an acrylic polymer. U.S. Pat. No. 5,418,283, the disclosure of which is incorporated herein by reference, discloses the use of an ultra high molecular weight acrylic polymer for improving the transfer efficiency of paint. The preferred polymeric materials used in the practice of the present invention are those known in the art as ultra high molecular weight (UHMW) polymers. These polymers typically have a molecular weight of at least 4,000,000, and more preferably a molecular weight in the range of 8,000,000–12,000,000. As disclosed in the '283 patent, this ultra high molecular weight polymeric material is incorporated into a paint formulation, typically at a concentration of approximately 100–1,000 ppm, and acts to increase the transfer efficiency of the painting process. It should be noted that there is some inherent uncertainty in the measurement of molecular weights of UHMW polymers; therefore, all of the molecular weights given herein are approximate. Molecular weights specified in this disclosure are all measured on the basis of viscosity as detailed in the '283 patent.

As disclosed in the '283 patent, solid polymeric material is added to the solvent vehicle of the paint; and in some instances, the polymeric material is added to the paint as a toluene based solution. While the ultra high molecular weight polymers of the '283 patent do significantly increase the transfer efficiency of paint, as a practical matter, use of the polymeric materials is difficult. The very high molecular weight of the polymer makes the material very difficult to dissolve in most paint formulations, and when the solid polymeric material is added to paints, full dissolution of the material only occurs after several days time. When the UHMW polymer is dissolved in conventional paint solvents such as toluene or xylene, prior to addition to the paint, the resultant paint films have been found to have a poor surface quality. These problems have limited the use of the ultra high molecular weight acrylic polymers as transfer efficiency enhancing agents. Thus, it is necessary to have a method and/or composition which allows ultra high molecular weight, transfer efficiency improving polymers to be incorporated into paints without requiring unduly long dissolution times or adversely affecting the quality of finish of painted articles.

As will be explained in detail hereinbelow, the inventor hereof has found that specific solvent materials readily dissolve ultra high molecular weight, transfer-efficiency-improving polymers, so as to permit their ready incorporation into paint compositions; additionally, this group of additive solutions do not adversely affect the quality of painted surfaces produced therefrom.

BRIEF DESCRIPTIONS OF THE INVENTION

There is disclosed herein an additive for improving the transfer efficiency of paint. The additive is comprised of a polymer having a molecular weight of at least 4,000,000 and a solvent for the polymer. The solvent is selected from the group consisting of glycol ethers, halogenated aromatic materials, and combinations thereof. In a particular group of embodiments, the polymer has a molecular weight in the range of 8,000,000–12,000,000, and in a specifically preferred embodiment, the polymer is an acrylic polymer.

The glycol ether may comprise a monoalkyl ether, and in specific embodiments, the monoalkyl ether is a $C_1$–$C_4$ alkyl ether. In other embodiments, the glycol ether is an ester of a glycol ether, and one particularly preferred glycol ether ester comprises ethylene glycol monoethyl ether acetate. In certain embodiments, the halogenated aromatic compound is a chlorofluoro aromatic compound such as parachlorobenzotrifluoride. In other embodiments, the halogenated aromatic compound is a chlorotoluene, while in yet other embodiments the halogenated aromatic compound is a benzotrifluoride.

Also disclosed herein are methods for improving the transfer efficiency of paint through the use of the additive of the present invention. In a typical application, the additive is present in the paint in an amount sufficient to provide a concentration in the range of 50–300 ppm of the ultra high molecular weight polymer in the paint.

DETAILED DESCRIPTION OF THE INVENTION

Figure 1A:
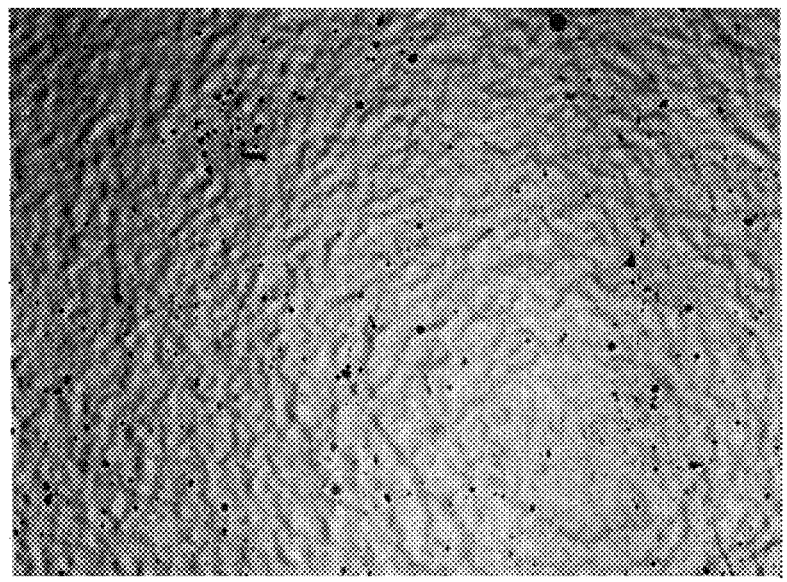
FIGS. 1A–1D comprise electron photomicrographs from an experimental series evaluating the performance of the transfer efficiency improving composition of the present invention, and showing the advantages thereof over other formulations.
Figure 1B:
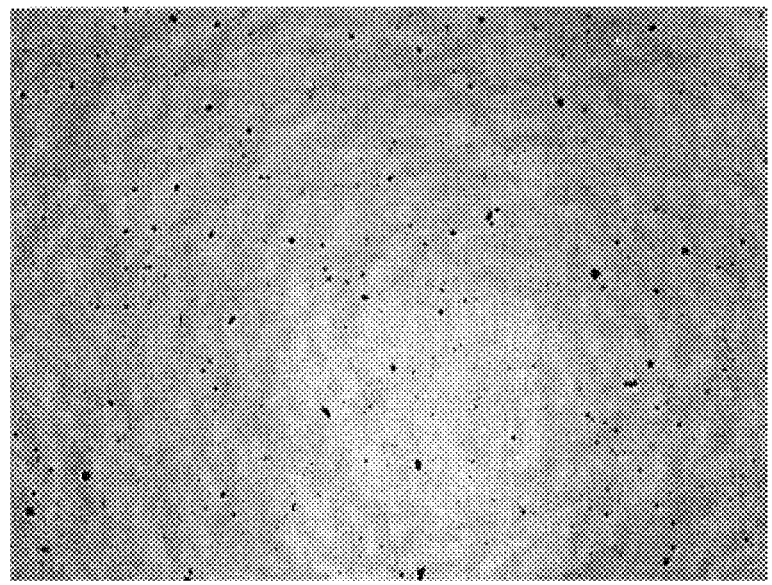

In accord with the present invention it has been found that ultra high molecular weight polymers which increase the transfer efficiency of paints can be advantageously employed as solutions of the polymer in a specific group of solvents. The preferred solvents include glycol ethers and halogenated aromatic materials. This class of solvents readily dissolves the polymeric materials and is compatible with a large number of paint formulations. In addition, it has been found that the particular group of solvents does not adversely affect the quality of the finished paint film; and in some instances, actually improves surface quality of paint finishes, as compared to those prepared from compositions not including the preferred solvents.

The glycol ethers preferred for the practice of the present invention include those materials commonly known in the art as cellosolves and include esters thereof, particularly the cellosolve acetate esters. However, other esters may likewise be employed; and, non-esterified species, including diethers and monoalkyl ethers of ethylene glycol, can be used in the practice of the present invention. One specifically preferred material comprises ethylene glycol monoethyl ether acetate. Other preferred materials of this type comprise the monomethyl, monopropyl and monobutyl analogs.

Another preferred class of solvent materials comprises haloaromatics, and in some specific instances, chlorofluoro aromatics are particularly preferred. Among the preferred haloaromatics is monochlorotoluene. Another preferred material comprises parachlorobenzotrifluoride, a material also known as 1 chloro 4 trifluoromethylbenzene, and such material is commercially available from the Occidental Chemical company under the name Oxsol® 100. A similar preferred material is also available from the Occidental Chemical company under the name Oxsol® 2000, and this material is referred to as benzotrifluoride or trifluoromethylbenzene. Other analogous materials will be readily apparent to one of skill in the art and may be employed with equal advantage.

One unique and unexpected finding of the present invention is that there is no apparent correlation between the boiling points and evaporation rates of the preferred solvents of the present invention, with the surface quality of the paint finish achieved. That is to say, other solvents which have boiling points and evaporation rates similar to those of the preferred solvents of the present invention, and which are capable of solvating the ultra high molecular weight polymer, do not achieve the benefits of the present invention. As will be detailed hereinbelow, the solvents of the present invention were compared with other solvents conventionally employed in painting processes such as methyl isobutyl ketone, n-butylacetate and xylene. Results achieved utilizing the materials of the present invention are superior to those achieved using other solvents.

In the experimental series, solutions of ultra high molecular weight methyl methacrylate were dissolved in a series of solvents, and the resultant solutions were added to samples of paint (Du Pont automotive Victory Red) or to clear coat material (Du Pont) such that the polymer concentrations in the final paint samples were approximately 200 ppm. Separate 4×10 inch steel panels were sprayed with each of the paint samples and cured in accord with the manufacturer's directions. The samples were then evaluated for smoothness and distinctness of image. The evaluations were carried out visually and by electron microscopy. In addition to the foregoing, control samples were prepared utilizing no additives whatsoever.

Figure 1C:
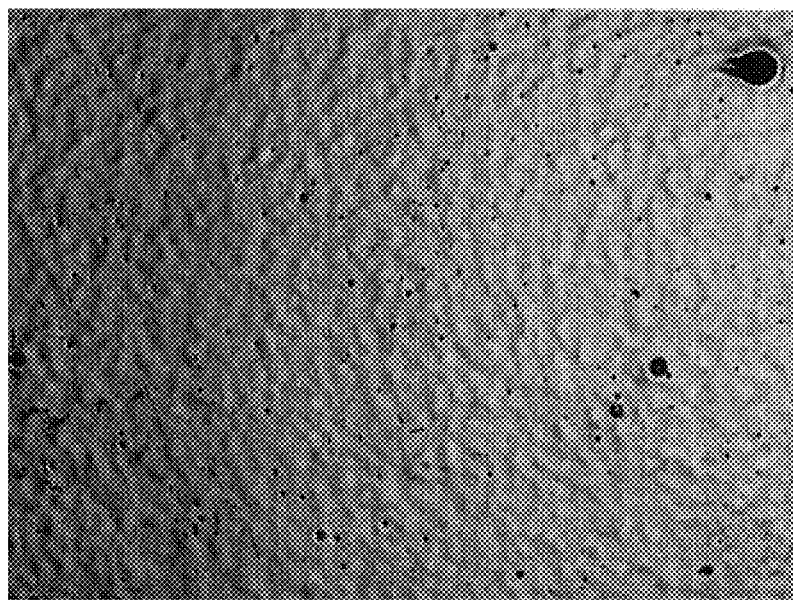

The results of the evaluation are depicted on the attached sheets labeled FIGS. 1A–1D and 2A–2D. These sheets show electron micrographs of various of the samples prepared in accord with the foregoing procedures. FIG. 1C shows a control sample coated with paint and clear coat which did not include any additives. FIG. 1A shows a test panel coated with paint and clear coat, both of which include an additive comprising UHMW acrylic polymer dissolved in methyl isobutyl ketone (MIBK). The amount of additive was such so that the amount of the UHMW polymer was 200 ppm in each of the paint and clear coat. As can be seen, the surface quality of the panel coating of FIG. 1A is lower than that of the control.

Figure 1D:
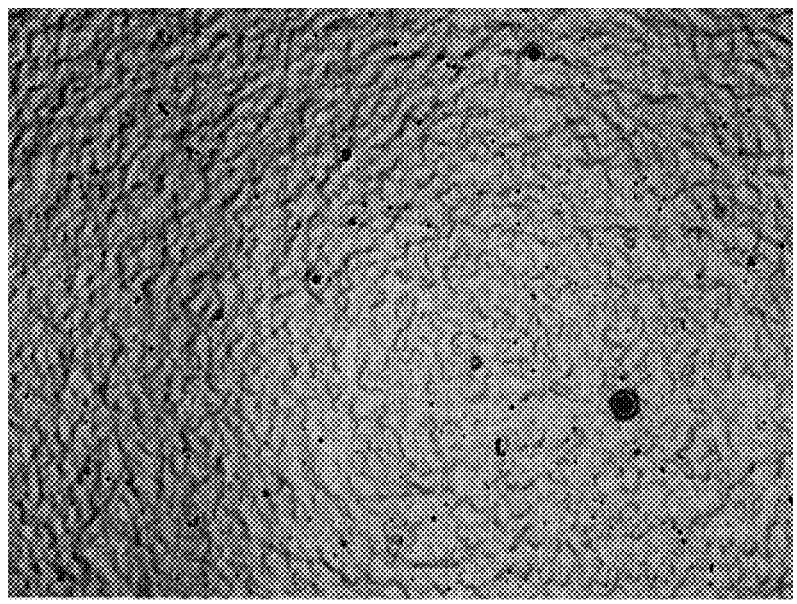

The panel of FIG. 1D is coated with paint and clear coat having a xylene-based solution of the UHMW polymer incorporated as an additive. Concentration of the UHMW polymer was 208 ppm in the paint and 210 ppm in the clear coat. Again, the surface quality is lower than that of the control. The panel of FIG. 1B was prepared in accord with the present invention and includes the polymeric additive dissolved in ethylene glycol monoethyl acetate. The concentration in the paint and clear coat was 208 ppm. It will be seen that the surface quality is significantly better than that of the control.

Figure 2A:
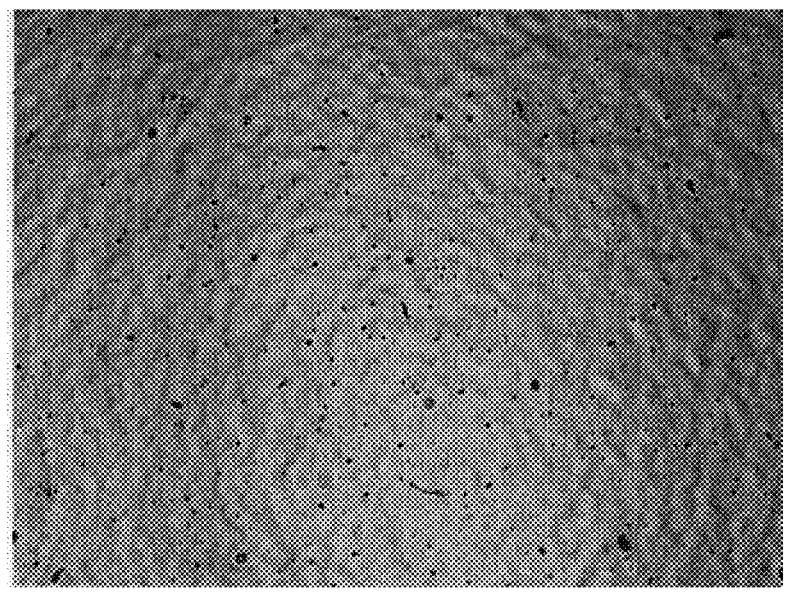
FIGS. 2A–2D are electron micrographs from a second experimental series illustrating the advantages of the present invention as compared to other compositions.
Figure 2B:
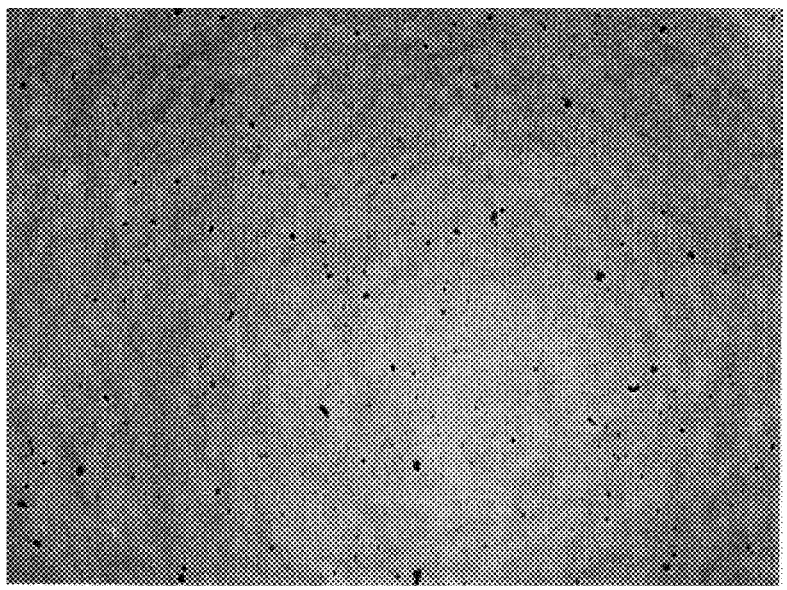
Figure 2C:
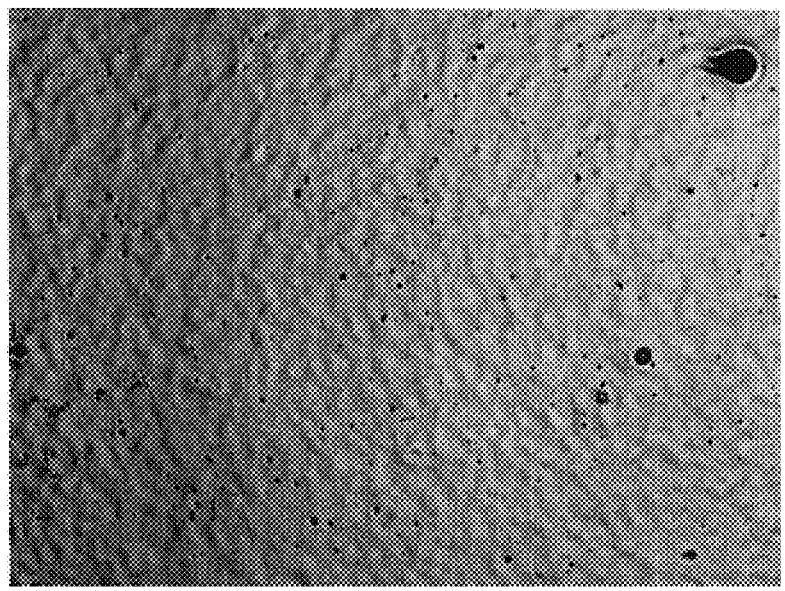
Figure 2D:
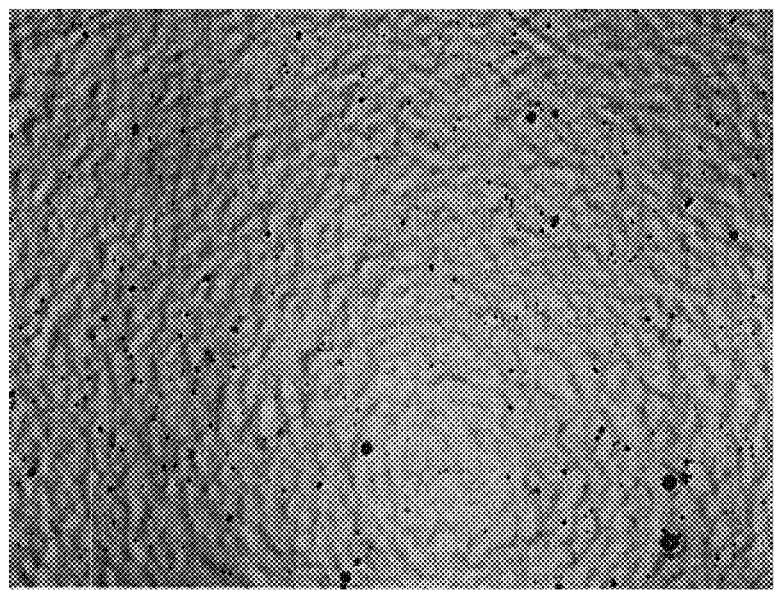

Referring now to FIGS. 2A–2D, there is shown similar data for the other solvents. Again, panel 2C is a control as per FIG. 1. The panel of FIG. 2A is in accord with the present invention and includes the UHMW polymeric additive dissolved in the aforementioned Oxsol® 100 halogenated aromatic solvent. Polymer concentration in the paint is 204 ppm, and the concentration in the clear coat is 210 ppm. Surface quality is notably better than that of the control. The panel of FIG. 2D includes the polymer dissolved in n-butyl acetate, in an amount sufficient to give a polymer concentration of 200 ppm in both the paint and clear coat, and it will be seen that surface quality is worse than that of the control.

The conclusion from the foregoing series is that the specific solvents of the present invention provide for the ready dissolution of ultra high molecular weight, transfer-efficiency-improving polymers, while preserving, and in most instances enhancing, the surface quality of paint films produced therefrom. This result is unexpected in view of the prior art, since other solvents which solvate the polymer and are compatible with paint and which have evaporation rates and boiling points similar to those of the solvents of the present invention do not produce the high quality surfaces achieved through the use of the solvents of the present invention.

While the foregoing examples describe some very specific solvents, the use of other glycol ethers and halogenated aromatics will be apparent to one of skill in the art. Typically, the polymeric additive will be present in an amount of approximately 50–500 ppm in a paint formulation, and the amount of solvent will be adjusted accordingly. In some instances, greater concentrations or lesser concentrations of transfer efficiency improving polymer may be employed as will be apparent to one of skill in the art.

The foregoing discussion, description and examples are illustrative of specific embodiments of the invention but are not meant to be limitations upon the practice thereof. It is the following claims, including all equivalents, which define the scope of this invention.

What is claimed is:

1. A method for improving the transfer efficiency of paint, said method comprising the steps of:
   providing an additive, said additive comprising: a polymer having a molecular weight of at least 4,000,000; and a solvent for said polymer, said solvent selected from the group consisting of: glycol ethers, halogenated aromatic materials, and, combinations thereof;
   mixing said additive into a volume of a paint; and spray coating an article with said paint; whereby said additive improves the transfer efficiency of said paint.

2. The method of claim 1, wherein the step of mixing said additive into said paint comprises mixing a sufficient amount of said additive into said paint so as to provide a concentration of 50–300 ppm of said polymer in said paint.

3. The method of claim 1, wherein said polymer comprises an acrylic polymer.

4. The method of claim 1, wherein said glycol ether comprises an ester of a glycol ether.

5. The method of claim 1, wherein said halogenated aromatic material comprises 1 chloro 4 trifluoromethylbenzene.

6. The method of claim 1, wherein said halogenated aromatic compound comprises chlorofluoro aromatic compound.

7. The method of claim 1, wherein said halogenated aromatic compound comprises chlorotoluene.

* * * * *